United States Patent
Kim et al.

(10) Patent No.: US 11,281,778 B2
(45) Date of Patent: Mar. 22, 2022

(54) DEVICE AND METHOD FOR VERIFYING APPLICATION

(71) Applicant: SAMSUNG ELECTRONICS CO., LTD., Suwon-si (KR)

(72) Inventors: Dong-uk Kim, Suwon-Si (KR); Ji-hoon Kim, Seoul (KR); Chang-sup Ahn, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 370 days.

(21) Appl. No.: 16/332,652

(22) PCT Filed: Nov. 28, 2016

(86) PCT No.: PCT/KR2016/013760
§ 371 (c)(1),
(2) Date: Mar. 12, 2019

(87) PCT Pub. No.: WO2018/052166
PCT Pub. Date: Mar. 22, 2018

(65) Prior Publication Data
US 2021/0216635 A1    Jul. 15, 2021

(30) Foreign Application Priority Data

Sep. 13, 2016 (KR) .................. 10-2016-0118214

(51) Int. Cl.
*G06F 21/57* (2013.01)
*H04L 9/32* (2006.01)

(52) U.S. Cl.
CPC ............ *G06F 21/57* (2013.01); *H04L 9/3236* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 7,103,779 B2* | 9/2006 | Kiehtreiber | ........... | H04L 9/3239 713/187 |
| 8,453,237 B2* | 5/2013 | Bates | .................. | G06F 9/44589 726/22 |
| 8,601,273 B2* | 12/2013 | Schluessler | ........... | H04L 9/3236 713/176 |
| 8,683,213 B2* | 3/2014 | Prabhakaran | ......... | G06F 9/4401 713/187 |
| 8,776,245 B2 | 7/2014 | Sahita et al. | | |

(Continued)

FOREIGN PATENT DOCUMENTS

KR  10-2011-0125698 A  11/2011
KR  10-2015-0039444 A  4/2015

OTHER PUBLICATIONS

International Search Report dated May 30, 2017 by the International Searching Authority in counterpart International Patent Application No. PCT/KR2016/013760. (PCT/ISA/210).

(Continued)

*Primary Examiner* — Michael Pyzocha
(74) *Attorney, Agent, or Firm* — Sughrue Mion, PLLC

(57) ABSTRACT

A method of verifying an application, according to an embodiment, includes: storing application codes; loading a part of the application codes into a memory; and verifying the application by using the codes loaded into the memory.

13 Claims, 7 Drawing Sheets

(56) References Cited

U.S. PATENT DOCUMENTS

| | | | |
|---|---|---|---|
| 9,195,824 B2 | 11/2015 | Smith et al. | |
| 2001/0054143 A1 | 12/2001 | Miyazawa et al. | |
| 2002/0026634 A1* | 2/2002 | Shaw | G06F 21/51 717/173 |
| 2003/0229777 A1* | 12/2003 | Morais | G06F 21/575 713/2 |
| 2005/0010767 A1 | 1/2005 | Craft | |
| 2006/0026569 A1* | 2/2006 | Oerting | G06F 21/51 717/126 |
| 2006/0161761 A1* | 7/2006 | Schwartz | G06F 21/52 711/216 |
| 2008/0256360 A1* | 10/2008 | Guzman | G06F 21/575 713/176 |
| 2010/0082997 A1* | 4/2010 | Elbaum | G06F 21/72 713/180 |
| 2010/0191974 A1 | 7/2010 | Dubhashi et al. | |
| 2012/0331303 A1* | 12/2012 | Andersson | G06F 21/51 713/189 |
| 2013/0263255 A1* | 10/2013 | Wolf | G06F 21/64 726/21 |
| 2014/0188949 A1* | 7/2014 | Martinez | G06F 16/137 707/821 |
| 2015/0074384 A1* | 3/2015 | Yajima | G06F 21/575 713/2 |
| 2016/0239364 A1* | 8/2016 | Nam | G06F 11/3604 |
| 2017/0109546 A1* | 4/2017 | Nerot | G06F 21/51 |
| 2017/0244729 A1* | 8/2017 | Fahrny | G06F 21/54 |
| 2018/0007037 A1* | 1/2018 | Reese | H04L 9/3297 |
| 2018/0075241 A1* | 3/2018 | Gomez | G06F 8/654 |
| 2018/0114000 A1* | 4/2018 | Taylor | H04L 9/3247 |

OTHER PUBLICATIONS

Written Opinion dated May 30, 2017 by the International Searching Authority in counterpart International Patent Application No. PCT/KR2016/013760. (PCT/ISA/237).

* cited by examiner

DEVICE AND METHOD FOR VERIFYING APPLICATION

TECHNICAL FIELD

The present disclosure relates to a device and method for verifying an application.

BACKGROUND ART

A user may install an application on a device and execute the application. The application is created by a service provider that creates and provides content. The application that the user executes may be hacked. Therefore, it is necessary to verify whether the application is hacked.

The device may directly verify whether the application is hacked, or may verify whether the application is hacked through a security server.

DESCRIPTION OF EMBODIMENTS

Technical Problem

Provided are a device and method for verifying an application.

Provided is a computer-readable recording medium having recorded thereon a program for executing the method on a computer.

Solution to Problem

According to an aspect of the present disclosure, a method of verifying an application includes: storing application codes; loading a part of the application codes into a memory; and verifying the application by using the codes loaded into the memory.

BEST MODE

Figure 1:
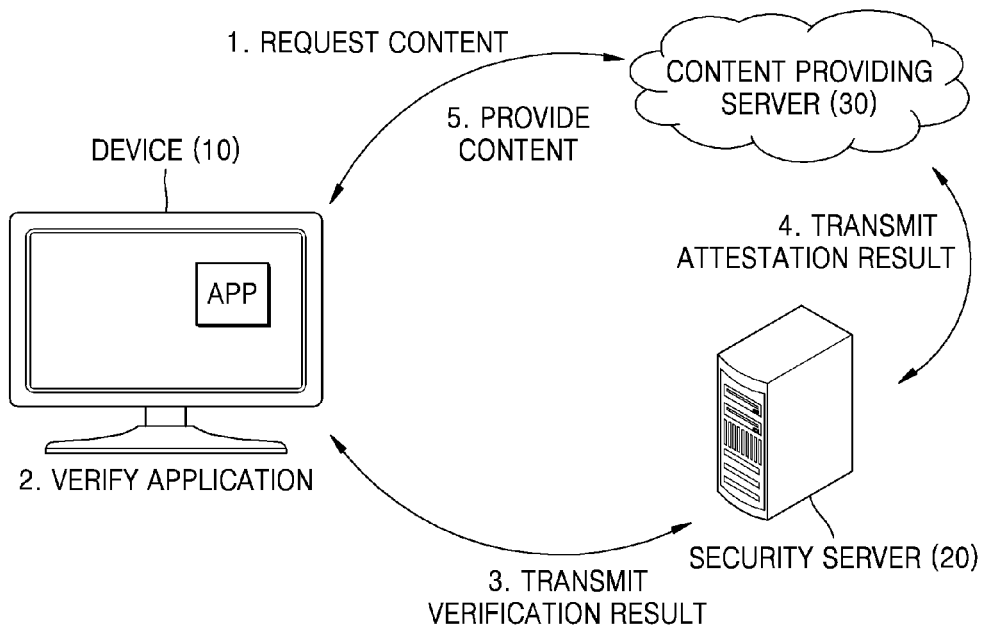
FIG. 1 is a diagram for describing a system for providing content, according to an embodiment.

A device according to an embodiment includes a disk configured to store application codes, a memory, and a processor, wherein the processor includes loading a part of the application codes into the memory and verifying the application by using the code loaded into the memory.

MODE OF DISCLOSURE

Hereinafter, embodiments of the present disclosure will be described in detail with reference to the accompanying drawings so that those of ordinary skill in the art may easily carry out the present disclosure. However, the present disclosure may be embodied in many different forms and is not limited to the embodiments described herein. In order to clearly describe the present disclosure, parts having no relation to the description are omitted, and like reference numerals are assigned to like elements throughout the specification.

The terms used herein are those general terms currently widely used in the art in consideration of functions in regard to the present disclosure, but the terms may vary according to the intention of those of ordinary skill in the art, precedents, or new technology in the art. Thus, the terms used herein should be understood not as simple names but based on the meaning of the terms and the overall description of the present disclosure.

It will be understood that, although the terms "first", "second", etc. may be used herein to describe various elements, these elements should not be limited by these terms. These terms are only used to distinguish one component from another.

In addition, the terms used herein are used only to describe specific embodiments and are not intended to limit the present disclosure. As used herein, the singular forms "a", "an", and "the" are intended to include the plural forms as well, unless the context clearly indicates otherwise. In addition, it will be understood that when a region is referred to as being "connected to" or "coupled to" another region, it may be directly connected or coupled to the other region or intervening regions may be present. It will be understood that terms such as "comprise", "include", and "have", when used herein, specify the presence of stated elements, but do not preclude the presence or addition of one or more other elements.

The term "the" and similar directives used herein (especially in the claims) may refer to both a singular form and a plural form. In addition, unless there is a description explicitly specifying the order of the operations describing methods according to the present disclosure, the operations described herein may be performed in an appropriate order. The present disclosure is not limited by the order of the operations described herein.

Therefore, the phrase "some embodiments" or "an embodiment" appearing in various places throughout this specification does not necessarily indicate the same embodiment.

Some embodiments of the present disclosure may be described in terms of functional block components and various processing operations. All or part of such functional blocks may be realized by any number of hardware and/or software components configured to perform specified functions. For example, the functional blocks of the present disclosure may be implemented by one or more microprocessors, or may be implemented by circuit configurations for predetermined functions. In addition, for example, the functional blocks of the present disclosure may be implemented by a variety of programming or scripting languages. The functional blocks may be implemented by algorithms that are executed on one or more processors. Furthermore, the present disclosure may employ conventional techniques for electronic environment configuration, signal processing, and/or data processing. The terms "mechanism", "component", "means", and "configuration" may be used in a broad sense and are not limited to mechanical and physical configurations.

Furthermore, the connecting lines or connecting members between components illustrated in the drawings are intended to represent exemplary functional connections and/or physical or circuit connections. It should be noted that various alternative or additional functional connections, physical connections, or circuit connections may be present in a practical device.

Hereinafter, the present disclosure will be described in detail with reference to the accompanying drawings.

FIG. 1 is a diagram for describing a system for providing content, according to an embodiment. Referring to FIG. 1, a device 10 verifies an application, and a content providing server 30 receives the verification result from a security server 20. The content providing server 30 may provide content to the device 10 according to the verification result. Verifying the application indicates determining whether the application has been forged or falsified. In other words, verifying the application indicates determining whether an application created by the content providing server 30 coincides with an application executed by the device 10.

The device 10 executes the application. A user may select the content by using the application. The device 10 requests the content providing server 30 for the content selected by the user. The content providing server 30 does not provide the content until the content providing server 30 receives the application verification result. Alternatively, the content providing server 30 may provide only a part of the content until the content providing server 30 receives the application verification result.

The device 10 verifies the application. The device 10 may verify the application by using application codes loaded into the memory. When the application codes are stored in a disk (or storage), the application codes may not be forged or falsified, and the application codes loaded into the memory may be forged or falsified. Therefore, the device 10 may verify whether the application has been forged or falsified by comparing the application code loaded into the memory with original code. The original code may be stored in a disk or a safe area. A method by which the device 10 verifies the application will be described in detail below.

The device 10 transmits the application verification result to the security server 20. The device 10 may transmit a sign when transmitting the verification result to the security server 20. The sign is information that is shared only by the device 10 and the security server 20. The sign may be a secret key that is shared only by the device 10 and the security server 20. The security server 20 may verify the sign and trust the verification result received from the device 10. In other words, when the sign is forged or falsified, the security server 20 does not trust the application verification result received from the device 10.

The device 10 is an electronic device capable of installing and executing an application, such as a TV, a mobile device (a mobile phone, a tablet, or the like), a wearable device (a smart watch or the like), or a PC. The application may be a program designed to perform a specific function. For example, the application may be a program for receiving content from the content providing server 30 and reproducing the content.

The security server 20 transmits an attestation result to the content providing server 30. The attestation result includes the application verification result and the sign verification result. When both the application verification result and the sign verification result are normal, the security server 20 attests the integrity of the application. When either the application verification result or the sign verification result is not normal, the security server 20 determines that the application has been forged or falsified.

The content providing server 30 provides the content to the device 10 according to the attestation result received from the security server 20. The content providing server 30 provides the content to the device 10 only when the application has not been forged or falsified.

Figure 2:
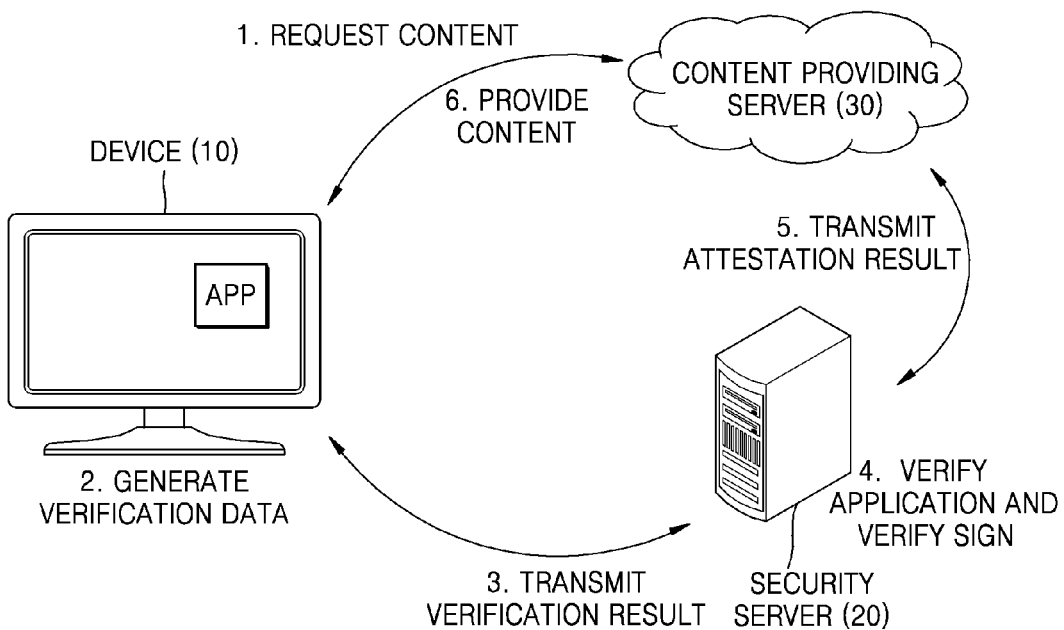
FIG. 2 is a diagram for describing a system for providing content, according to an embodiment.

FIG. 2 is a diagram for describing a system for providing content, according to an embodiment. Referring to FIG. 2, a security server 20 may verify an application, and a content providing server 30 may provide content to a device 10 according to the verification result.

The device 10 executes the application. A user may select the content by using the application. The device 10 requests the content providing server 30 for the content selected by the user.

The device 10 generates verification data. The verification data is generated by using application codes loaded into the memory. For example, the verification data may be the application codes loaded into the memory. In addition, the device 10 may generate a hash by using the application codes loaded into the memory, and the generated hash may be used as the verification data. In addition, the device 10 may generate a hash by using a part of the application codes loaded into the memory. In addition, the device 10 may generate a hash by using the application codes loaded into the memory and the application codes stored in the disk.

The device 10 transmits the verification data to the security server 20. For example, the device 10 generates a hash and transmits the generated hash to the security server 20 as the verification data. The device 10 may also transmit the application codes loaded into memory to the security server 20 as the verification data. In addition, the device 10 may combine the application code loaded into the memory and the code stored in the disk and transmit the hash of the entire code to the security server 20 as the verification data.

The security server 20 verifies the application by using the verification data. The security server 20 stores the code when the application code or the application is loaded into the memory. The code stored by the security server 20 is code that is not forged or falsified. The security server 20 may use the stored code to determine whether the verification data has been forged or falsified. For example, the security server 20 may generate a hash of the code stored in the security server 20 and compare whether the hash generated by the security server 20 is identical to the hash received from the device 10.

The security server 20 verifies a sign. The security server 20 verify the reliability of the verification data received from the device 10 by verifying the sign received from the device 10.

The security server 20 transmits the attestation result to the content providing server 30. The security server 20 transmits the attestation result to the content providing server 30 according to the application verification result and the sign verification result.

The content providing server 30 provides the content to the device 10 according to the attestation result received from the security server 20. The content providing server 30 provides the content to the device 10 only when the application has not been forged or falsified.

Figure 3:
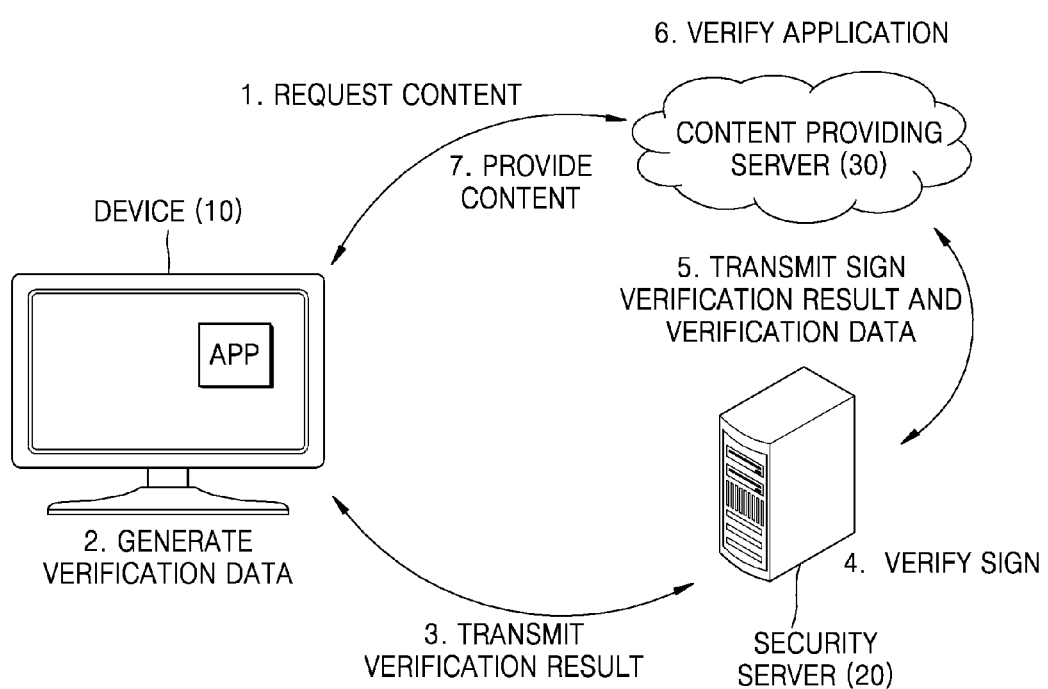
FIG. 3 is a diagram for describing a system for providing content, according to an embodiment.

FIG. 3 is a diagram for describing a system for providing content, according to an embodiment. Referring to FIG. 3, a content providing server 30 may verify an application, and a content providing server 30 may provide the content to the device 10 according to the verification result.

The device 10 executes the application. A user may select the content by using the application. The device 10 requests the content providing server 30 for the content selected by the user.

The device 10 generates the verification data by using application codes loaded into the memory. The device 10 transmits the verification data to the security server 20. The device 10 transmits a sign to the security server 20 together with the verification data.

The security server 20 verifies the sign. The security server 20 verifies only the sign, without verifying the verification data.

The security server 20 transmits the sign verification result and the verification data to the content providing server 30.

The content providing server 30 verifies the application executed in the device 10 by using the verification data. The content providing server 30 may verify the application only when the sign verification result is normal. When the sign verification result is not normal, the content providing server 30 does not trust the integrity of the verification data, and the content providing server 30 does not provide the content to the device 10. The content providing server 30 verifies the application executed in the device 10 by comparing the verification data with the application code stored in the content providing server 30.

Figure 4:
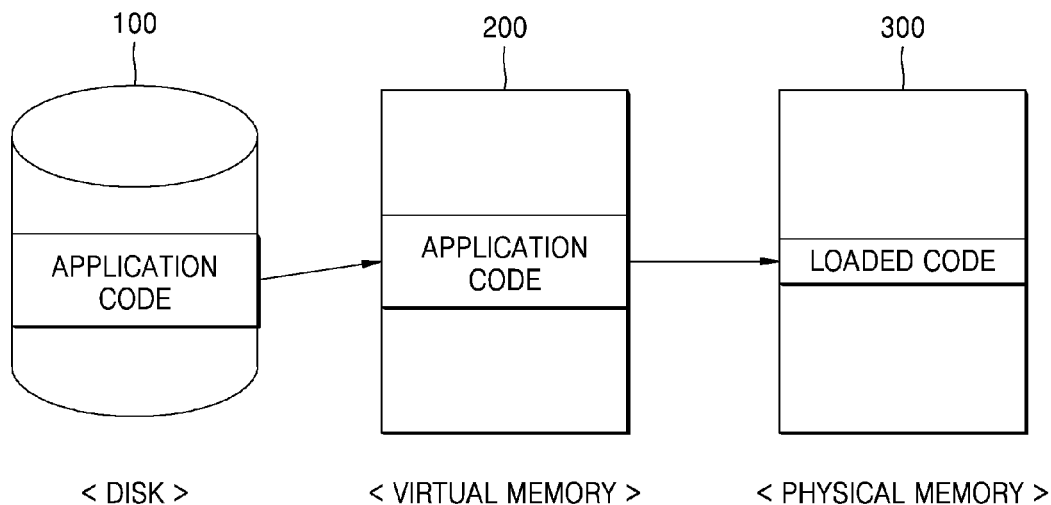
FIG. 4 is a diagram for describing a form in which application code is used.

FIG. 4 is a diagram for describing a form in which application code is used.

The device 10 may download application codes, and the downloaded application codes are stored in a disk 100.

The application codes may be loaded into a virtual memory 200. The virtual memory 200 is allocated to a processor that executes the application.

A part of the application codes is loaded into a physical memory 300. Since a space of the physical memory 300 is limited, the entire application codes are not loaded into the physical memory 300, and only the application code in use is loaded into the physical memory 300.

The application code may be forged or falsified when stored in the disk 100, and the code loaded into the physical memory 300 may be forged or falsified. The device 10 may verify the code stored in the disk 100 and the code loaded into the physical memory 300.

Figure 5:
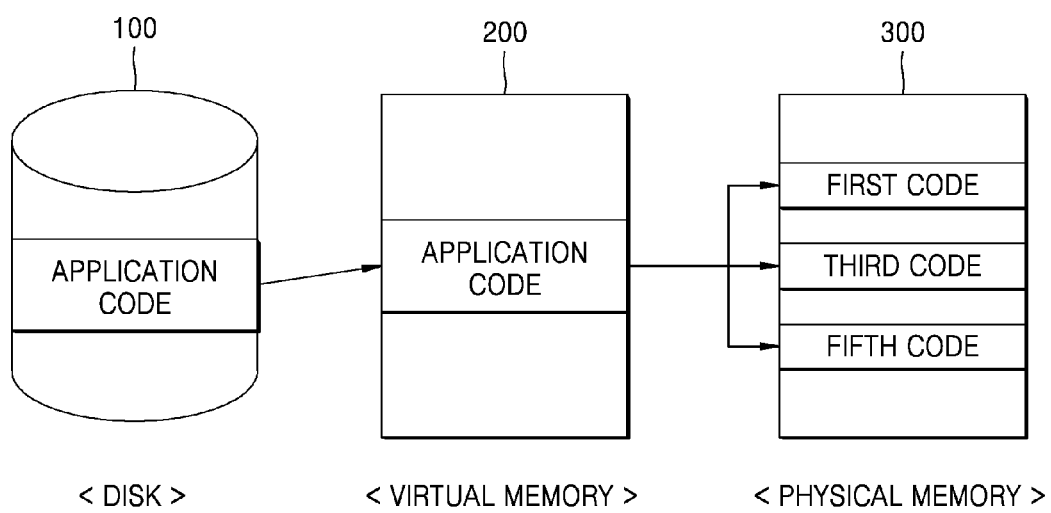
FIG. 5 is a diagram for describing a method of verifying an application by using code loaded into a physical memory, according to an embodiment.

FIG. 5 is a diagram for describing a method of verifying an application by using code loaded into a physical memory, according to an embodiment.

For example, application codes may include first to fifth codes. Each of the first to fifth codes indicates a part of the application codes.

The first code, the third code, and the fifth code may be loaded into the physical memory 300. A location of the physical memory 300 into which each code is loaded may be tracked by using a loadable kernel module (LKM).

The first code, the third code, and the fifth code may be forged or falsified when loaded into the physical memory 300. For example, the first code loaded into the physical memory 300 may be a falsified code.

The device 10 may verify the application by using the first code, the third code, and the fifth code. For example, the device 10 verifies whether the first code is forged or falsified. In addition, the device 10 may verify whether the first code, the third code, and the fifth code are forged or falsified. The first code, the third code, and the fifth code may be used as the verification data and may be transmitted to the security server 20.

Figure 6:
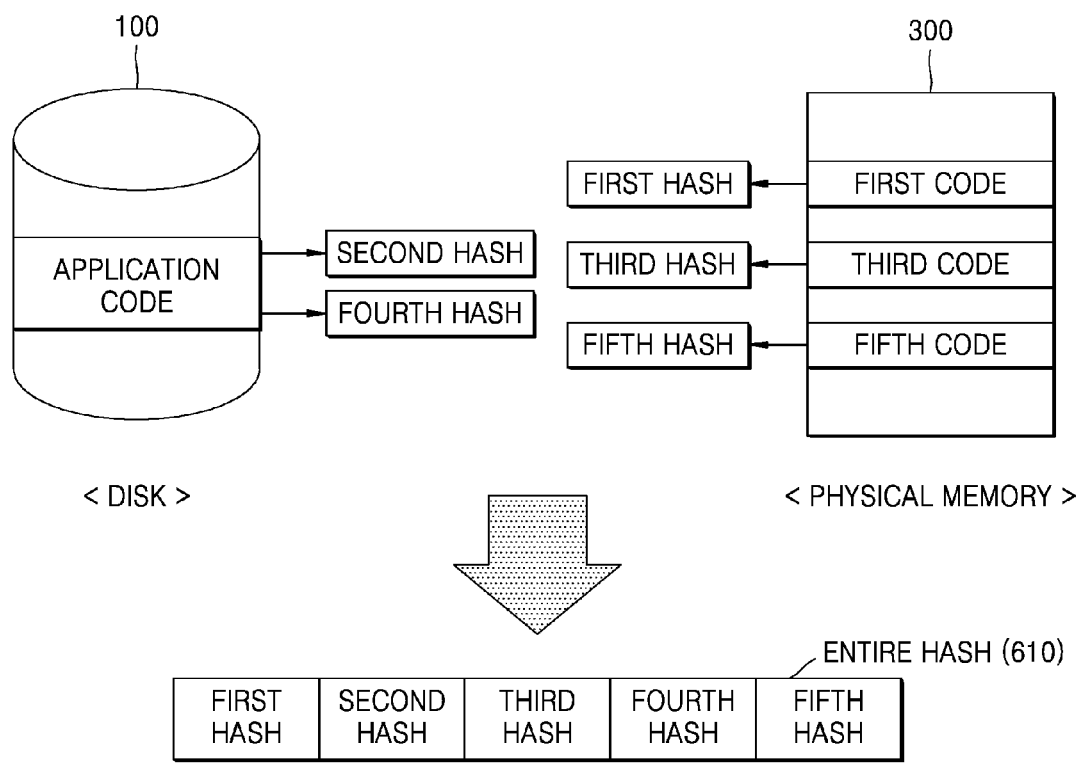
FIG. 6 is a diagram for describing a method of generating an entire hash, according to an embodiment.

FIG. 6 is a diagram for describing a method of generating an entire hash, according to an embodiment. Referring to FIG. 6, the device 10 may generate an entire hash 610 by using a hash of code stored in a disk 100 and a hash of code loaded into a physical memory 300.

For example, the entire application codes include first to fifth codes. The first code, the third code, and the fifth code are loaded into the physical memory 300, and the entire application codes are stored in the disk 100.

The device 10 generates a first hash for the first code from the physical memory 300, generates a third hash for the third code from the physical memory 300, and generates a fifth hash for the fifth code from the physical memory 300. The device 10 reads a second code from the disk 100 and generates a second hash for the second code. The device 10 reads a fourth code from the disk 100 and generates a fourth hash for the fourth code. The device 10 sequentially combines (or concatenates) the first to fifth hashes to generate the entire hash 610.

The entire hash 610 may be used as verification data. The entire hash 610 may be verified by the device 10, or may be transmitted to the security server 20. The device 10 may generate an original hash from application codes stored in a secure region and verify the entire hash 610 by comparing the original hash with the entire hash 610. The original hash may be generated in the same manner as the entire hash 610.

Figure 7:
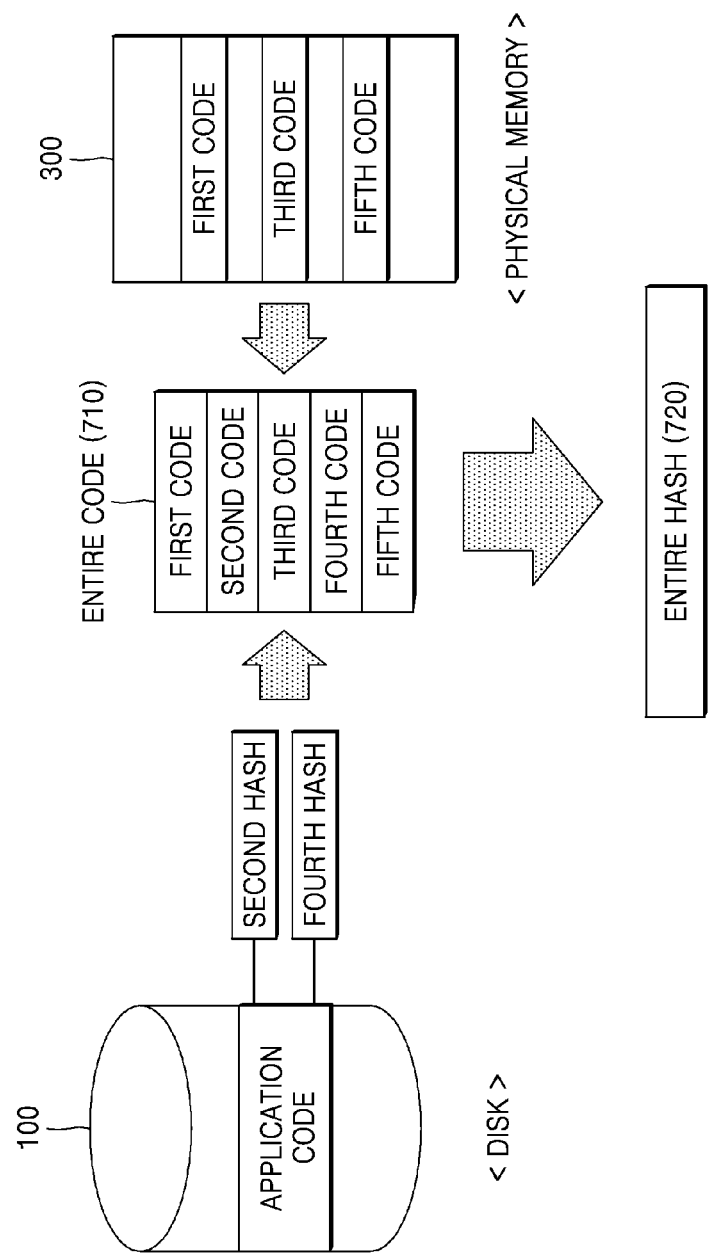
FIG. 7 is a diagram for describing a method of generating an entire hash, according to an embodiment.

FIG. 7 is a diagram for describing a method of generating an entire hash, according to an embodiment. Referring to FIG. 7, the device 10 may generate an entire hash 720 by using code stored in a disk 100 and code loaded into a physical memory 300.

For example, entire application codes include first to fifth codes. The first code, the third code, and the fifth code are loaded into the physical memory 300, and the entire application codes are stored in the disk 100.

The device 10 reads the first code, the third code, and the fifth code from the physical memory 300 and reads the second code and the fourth code from the disk 100. The device 10 combines the read first to fifth codes to generate entire code 710 and generates an entire hash 720 for the entire code 710.

The entire hash 720 may be verified by the device 10, or may be transmitted to the security server 20. The device 10 may generate an original hash from application codes stored in a secure region and verify the entire hash 720 by comparing the original hash with the entire hash 720. The original hash may be generated in the same manner as the entire hash 720.

Figure 8:
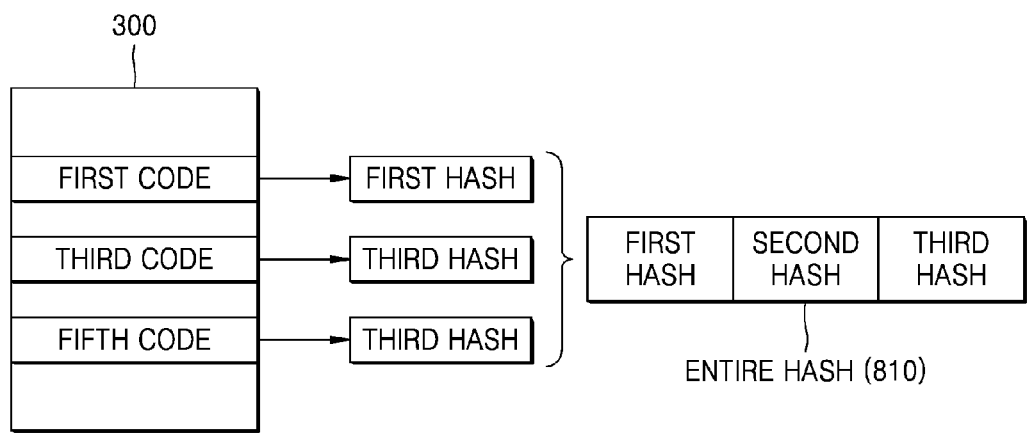
FIG. 8 is a diagram for describing a method of generating an entire hash, according to an embodiment.

FIG. 8 is a diagram for describing a method of generating an entire hash, according to an embodiment. Referring to FIG. 8, the device 10 may generate an entire hash 810 by using only code loaded into a physical memory 300.

When a first code, a third code, and a fifth code are loaded into the physical memory 300, the device 10 generates a first hash for the first code, a third hash for the third code, and a fifth hash for the fifth code.

The device 10 combines the first hash, the third hash, and the fifth hash to generate the entire hash 810. The entire hash 810 may be used as verification data.

Figure 9:
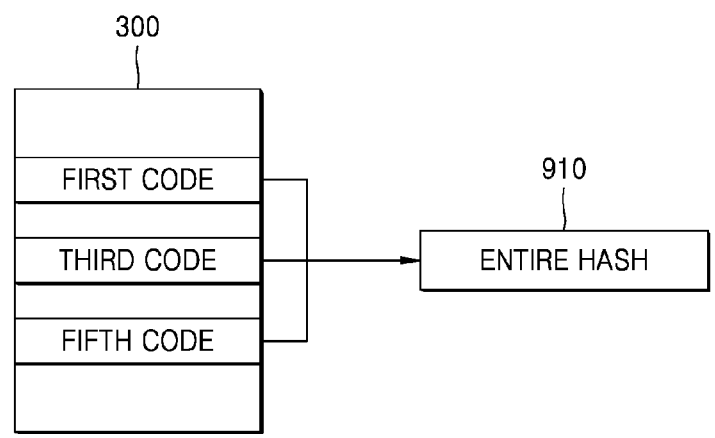
FIG. 9 is a diagram for describing a method of generating an entire hash, according to an embodiment.

FIG. 9 is a diagram for describing a method of generating an entire hash, according to an embodiment. Referring to FIG. 9, the device 10 may generate an entire hash 910 by using only code loaded into a physical memory 300.

When the first code, the third code, and the fifth code are loaded into the physical memory 300, the device 10 combines a first code, a third code, and a fifth code to generate code and generates the entire hash 910 for the generated code. In FIG. 8, the hashes for the respective codes are generated and the generated hashes are combined. However, in FIG. 9, the entire hash 910 for the codes obtained by combining the respective codes (the entire code obtained by combining the first code, the third code, and the fifth code) is generated.

Figure 10:
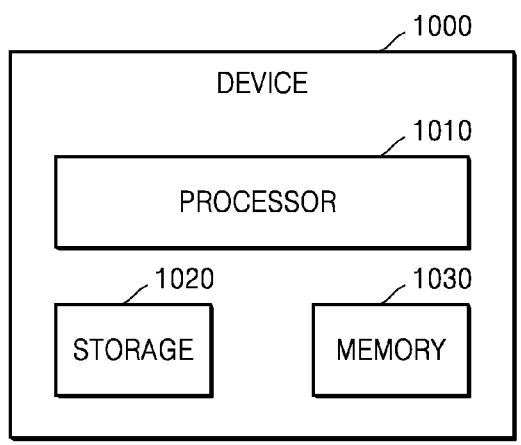
FIG. 10 is a block diagram for describing a device according to an embodiment.

FIG. 10 is a block diagram for describing a device according to an embodiment. Referring to FIG. 10, a device 1000 includes a processor 1010, a disk 1020, and a memory 1030.

The processor 1010 controls the disk 1020 and the memory 1030. The processor 1010 may store data in the disk 1020, or may read data from the disk 1020. The processor 1010 may load the data stored in the disk 1020 into the memory 1030. For example, the data may be a program, application code, or the like.

The processor 1010 loads the data into the memory 1030 and uses the data stored in the disk 1020. The processor 1010 may load, into the memory 1030, only necessary data among the data stored in the disk 1020.

The processor 1010 may verify the data stored in the disk 1020. The processor 1010 may compare data stored in a secure region with the data stored in the disk 1020. The device 1000 may use a part of the disk 1020 or a separate space as a secure region.

The processor 1010 may verify the data loaded into the memory 1030. The processor 1010 may verify only the data loaded into the memory 1030, or may verify only a part of the data loaded into the memory 1030. The processor 1010 may combine the data loaded into the memory 1030 and the data stored in the disk 1020 and verify the combined data. The processor 1010 may generate a hash of the data and verify the data by using the hash.

The processor 1010 may compare the data loaded into the memory 1030 with the data stored in the secure region. Alternatively, the device 1000 may transfer the data loaded into the memory 1030 to an external server. The external server may verify the received data by comparing the data received from the device 1000 with the original data.

The disk 1020 stores the data. A specific region of the disk 1020 may be a secure region. The disk 1020 may be a non-volatile memory.

The memory 1030 may store data to be executed. The processor 1010 may load the data stored in the disk 1020 into the memory 1030. The memory 1030 may be a non-volatile memory.

Figure 11:
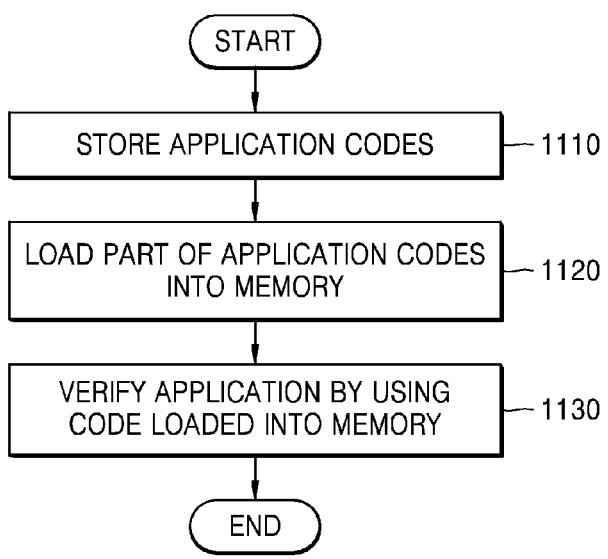
FIG. 11 is a flowchart for describing a method of verifying an application, according to an embodiment.

FIG. 11 is a flowchart of a method of verifying an application, according to an embodiment.

In operation 1110, the processor 1010 stores application codes in the disk 1020. The processor 1010 may store the application codes in the disk 1020 and a secure region. The application codes may be received from an external server. The secure region may be set in a partial region of the disk 1020 or a specific region inside the device 1000.

In operation 1120, the processor 1010 loads a part of the application codes into the memory 1030. The processor 1010 loads only necessary code among the application codes into the memory 1030.

In operation 1130, the processor 1010 verifies the application by using the code loaded into the memory 1030. The processor 1010 may compare the code stored in the disk 1020 with the code loaded into the memory 1030.

The processor 1010 may generate various types of hashes. For example, the processor 1010 reads, from the disk 1020, code that is not loaded into the memory 1030 and generates a hash (hash A) of the read code and the code loaded into the memory 1030. The processor 1010 generates a hash B corresponding to the hash A. The processor 1010 generates the hash (hash B) of the application code stored in the disk 1020. The method of generating the hash A is illustrated in FIGS. 6 and 7. The entire hash 610 or the entire hash 720 may be the hash A.

In addition, the processor 1010 generates a hash (hash C) by using only the code loaded into the memory 1030. The processor 1010 generates a hash (hash D) by using only the code corresponding to the code loaded into the memory 1030 among the application codes stored in the disk 1020. The method of generating the hash C is illustrated in FIGS. 8 and 9. The entire hash 810 or the entire hash 910 may be the hash C.

In addition, the processor 1010 generates a hash (hash E) by using only a part (first code) of the codes loaded into the memory 1030. The processor 1010 generates a hash (hash F) by using only the code corresponding to the first code among the application codes stored in the disk 1020.

The device according to the embodiment may verify the application codes by verifying the code loaded into memory.

The device according to the embodiment may transmit the code loaded into memory to the security server, and the security server may verify the code loaded into the memory.

The above-described embodiments may be embodied as computer programs and may be implemented by general-purpose digital computers that execute the computer programs by using a computer-readable recording medium. In addition, the data structures used herein may be recorded in a non-transitory computer-readable recording medium through various manners. In addition, embodiments may be embodied in a storage medium including instructions executable by a computer, such as a program module executed by the computer. For example, the methods implemented by software modules or algorithms may be stored in a computer-readable recording medium as program commands or computer-readable codes executable on the computer.

A computer-readable recording medium may be any medium which is accessible by the computer and may include any volatile/non-volatile media and any removable/non-removable media. Examples of the computer-readable recording medium may include a magnetic storage medium (for example, ROM, floppy disk, hard disk, or the like) and an optical reading medium (for example, CD-ROM, DVD, or the like), but the present disclosure is not limited thereto. In addition, the computer-readable recording medium may include any computer storage medium and any communication medium.

In addition, a plurality of computer-readable recording media may also be distributed over network-coupled computer systems so that the data (for example, program instructions or codes) stored in the distributed recording media may be executed by at least one computer.

The terms "unit" or "module" as used herein represents a unit for processing at least one function or operation, which may be implemented by hardware, software, or a combination thereof.

The "unit" and the "module" may be implemented by a program that is stored in an addressable storage medium and executed by a processor.

For example, the "unit" or the "module" includes components, such as software components, object-oriented software components, class components, or task components, processes, functions, attributes, procedures, subroutines, segments of programs codes, drivers, firmware, microcodes, circuits, data, databases, data structures, tables, arrays, and variables.

The invention claimed is:

1. A method of verifying an application, the method comprising:
storing application codes;
loading codes, which are a first part of the application codes, into a memory; and
verifying the application by using the codes loaded into the memory,
wherein the verifying further comprises:
reading code that is a second part, excluding the first part of the application codes, and is not loaded into the memory;
generating a hash A of the codes loaded into the memory and the read code;
generating a hash B of the stored application codes; and
verifying the application by comparing the hash B with the hash A, and
wherein the generating of the hash A comprises:
generating respective hashes of the codes loaded into the memory;
generating a hash of the read code, which is not loaded into the memory; and
combining the respective hashes of the codes loaded into the memory and the hash of the read code, to generate the hash A.

2. The method of claim 1, wherein the verifying further comprises:
generating a hash C of the codes loaded into the memory;
generating a hash D of code corresponding to the codes loaded into the memory among the application codes; and
verifying the application by comparing the hash C with the hash D.

3. The method of claim 1, wherein the verifying further comprises:
generating a hash E of a first code among the codes loaded into the memory;
generating a hash F of code corresponding to the first code among the application codes; and
verifying the application by comparing the hash E with the hash F.

4. The method of claim 1, wherein the verifying further comprises verifying the application by comparing whether the codes loaded into the memory is identical to code corresponding to the codes loaded into the memory among the application codes.

5. The method of claim 1, further comprising:
generating a hash C of the codes loaded into the memory; and
transmitting the hash C to a security server.

6. The method of claim 5, wherein the transmitting of the hash C to the security server comprises transmitting a sign to the security server together with the hash C, and
the sign is a secret key that is used by the security server and a device including the memory.

7. A non-transitory computer-readable recording media having recorded thereon a program for executing the method of claim 1 on a computer.

8. A device for verifying an application, the device comprising:
a disk configured to store application codes;
a memory; and
a processor,
wherein the processor is configured to perform:
loading codes, which are a first part of the application codes, into the memory; and
verifying the application by using the codes loaded into the memory,
wherein the processor is further configured to perform the verifying of the application by:
reading code that is a second part, excluding the first part of the application codes, and is not loaded into the memory;
generating a hash A of the codes loaded into the memory and the read code;
generating a hash B of the application codes; and
verifying the application by comparing the hash B with the hash A,
wherein the generating of the hash A comprises:
generating respective hashes of the codes loaded into the memory;
generating a hash of the read code, which is not loaded into the memory; and
combining the respective hashes of the codes loaded into the memory and the hash of the read code, to generate the hash A.

9. The device of claim 8, wherein the processor is further configured to:
generate a hash C of the codes loaded into the memory;
generate a hash D of a code corresponding to the codes loaded into the memory among the application codes; and
verify the application by comparing the hash C with the hash D.

10. The device of claim 8, wherein the processor is further configured to:
generate a hash E of a first code among codes loaded into the memory;
generate a hash F of a code corresponding to the first code among the application codes; and
verify the application by comparing the hash E with the hash F.

11. The device of claim 8, wherein the processor is further configured to verify the application by comparing whether the codes loaded into the memory is identical to a code corresponding to the codes loaded into the memory among the application codes.

12. The device of claim 8, wherein the processor is further configured to:
generate a hash C of the codes loaded into the memory; and
transmit the hash C to a security server.

13. The device of claim 12, wherein the processor is further configured to transmit a sign to the security server together with the hash C, and
the sign is a secret key that is used by the security server and the device including the memory.

* * * * *